United States Patent [19]

Brock et al.

[11] Patent Number: 4,935,176
[45] Date of Patent: Jun. 19, 1990

[54] METHOD OF AND APPARATUS FOR DETECTING DEFECTS IN AN ELECTRICAL CONDUCTOR

[75] Inventors: Roger M. Brock; Paul E. Large, Jr.; Larry J. Thompson, all of Carrollton, Ga.

[73] Assignee: Southwire Company, Carrollton, Ga.

[21] Appl. No.: 282,135

[22] Filed: Dec. 9, 1988

[51] Int. Cl.⁵ ............... B29C 47/06; B29C 47/92
[52] U.S. Cl. ..................... 264/40.2; 264/40.7; 264/174; 324/515; 324/543; 425/113; 425/136; 425/141; 425/162
[58] Field of Search .................. 264/40.1, 40.2, 40.7, 264/174; 425/113, 136, 140, 141, 151, 154, 162; 324/513, 515, 543

[56] References Cited

U.S. PATENT DOCUMENTS 3,841,810 10/1974 Robinson et al. .................. 425/113
4,260,566 4/1981 Brouwer et al. ............... 264/40.2 X
4,340,554 7/1982 Bardwell ........................... 264/40.7
4,387,336 6/1983 Joy et al. ............................ 324/515

Primary Examiner—Jeffery Thurlow
Assistant Examiner—Leo B. Tentoni
Attorney, Agent, or Firm—James W. Wallis, Jr.; George C. Myers, Jr.; Terrence Martin

[57] ABSTRACT

The present invention incorporates a conductor contact apparatus, a conductor defect detector, and a relay or equivalent added to the emergency stop circuit of a conductor insulation extruder apparatus in order to detect conductor defects and shut-down the extrusion apparatus before the conductor defect can cause the extruder to become blocked, interrupting normal production operations. The defect detector is especially adapted to detect variations in the cross-sectional area (or apparent cross-sectional area) of a conductor being insulated.

12 Claims, 1 Drawing Sheet

METHOD OF AND APPARATUS FOR DETECTING DEFECTS IN AN ELECTRICAL CONDUCTOR

TECHNICAL FIELD

The present invention relates to processes for extruding an insulation on electrical conductors of indefinite length, and more particularly to an apparatus and method for detecting incipient problems arising from certain conductor defects and interrupting the extrusion process prior to an occurrence of a break in the conductor.

BACKGROUND OF THE INVENTION

For many years, electrical cables have been insulated to avoid short-circuits. In recent decades, the insulation has been of plastic material, generally applied by an extruder in a known extrusion process in which a conductor is continuously advanced into the extrusion apparatus.

During the application of insulation to conductors by extrusion, certain conductor defects inevitably generate problems which cause conductor breakage or otherwise stop the extrusion process and interrupt production of the insulated conductor. Such production interruptions have occurred for many years and have resulted in uncounted wasted material and lost production time. In particular, a progressive defect known as a "birdcage" is a frequent occurrence and, if the extrusion apparatus is not promptly brought to a stop when a "birdcage" defect first appears, the conductor will break in the extruder, resulting in lost time restringing the conductor through the extruder and then restarting the production machinery. Cable conductor kinks are similarly problematical. Additional time and labor is required to return the system to normal operation producing acceptable cable at an acceptable production rate.

Investigation of the problem has revealed that, following the initiation of a "birdcage" defect, in which the wire cross-sectional diameter is increased, the conductor generally broke completely about 7 to 10 seconds after the "birdcage" defect first began. It was also discovered that certain extrusion machines could be shut down before conductor breakage occurred if the conductor defect could be detected sufficiently early in the progression of the defect. Typically, an emergency stop requires 4 to 5 seconds after emergency stop activation for the extrusion machinery to be completely shut down and stopped. Even the most alert extrusion machine operators cannot ordinarily shut down the machine in time to avoid conductor breakage.

SUMMARY OF THE INVENTION

The solution to the problem of cable breaks arising from "birdcage" defects, conductor kinks and similar problems as provided by the present invention is to locate a conductor defect detector upstream, i.e., in advance of the extruder, and to initiate an emergency stop of the system upon detection of the conductor defect. Thus, the defect detector according to the present invention is positioned to detect the defect before the cable enters the extruder and detection of the defect is used to shut down the system as rapidly as practicable. Such extrusion machines are ordinarily equipped with a machine or system emergency stop switch to shut down the system, and may be retrofitted with such emergency stop switches if not so equipped.

With the defect detector of the present invention in place, defects can be detected in time sufficient to shut down the extruder before a conductor break occurs. Thus, it is now possible with the invention for the machine operator to correct a defect and restart the machinery with a minimum of out-of-service time.

The present invention comprises the installation of a conductor defect detector positioned to detect the defect before entry into the extruder by utilizing the conductor(s) per se as a portion of a series circuit which is completed by a detector and a relay operating coil, the relay having contacts connected to the extruder emergency stop switch circuit or power source.

In a presently preferred embodiment of the invention, the electrical conductor is connected to a first electrical potential, the defect detector includes an insulative base surrounding a contact surface or ring through which the cable is strung. The ring is electrically connected to a relay coil which is in turn connected to a return for the first electrical potential. The relay includes contacts connected to the emergency stop switch such that operation of the relay activates the emergency stop function. Defects are detected when the conductor cross section contacts the detector ring, completing a circuit from the first electrical potential to the first electrical potential return via the relay coil. As the cable is advanced into and through the extruder, cross-sectional defects, including "birdcage" defects are detected, the relay coil circuit is energized to close (or open, as appropriate) the emergency stop circuit, and the extrusion process is interrupted as quickly as possible.

It is therefore an advantageous object of the present invention to detect incipient conductor breakage due to certain conductor defects and to shut down the extrusion apparatus before a conductor breakage occurs.

It is another object of the present invention to avoid unnecessary conductor breakage.

Another object of the present invention is to reduce material waste, operator labor costs, and machine down-time, resulting in improved production and lower product cost.

Yet another object resides in that these advantages are achieved with minimal added design and apparatus costs. The apparatus may be retrofitted to existing extruders at very lost cost.

Still another object of the present invention is to detect all significant conductor defects which result in increased cross-sectional area of the cable, such as "birdcages" and the like.

Another object of the present invention is to locate the detector at a minimum distance from the extrusion head corresponding to the time needed to shut down the machine when the conductor is advancing into the extruder at its maximum rate.

DESCRIPTION OF THE DRAWING FIGURES

For a further understanding of the nature and objects of the present invention, reference should be made to the following detailed description of the preferred embodiment taken in conjunction with the accompanying drawing figures wherein:

FIG. 1 is a simplified perspective view of a preferred embodiment of the present invention; and FIG. 2 is a simplified schematic illustration of the electrical operation of the present invention.

DETAILED DESCRIPTION OF THE PREFERRED EMBODIMENT

Figure 1:
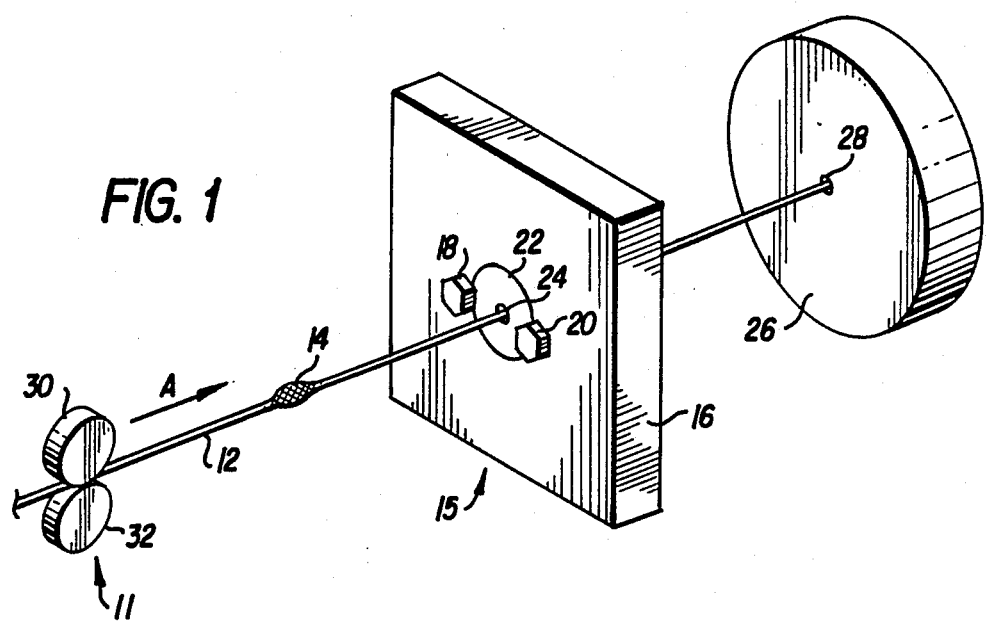

In the preferred embodiment of the present invention shown in FIG. 1, a conductor 12 of indeterminate length is advanced along a direction of travel indicated by arrow A into an extruder apparatus 26 via a conductor contactor 11 and a cable cross-section defect detector 15. Detector 15 in the preferred embodiment includes a block 16 made of insulative material generally disposed normal to the travel direction A of conductor 12. An electrically conductive ring 22 is mounted in a bore in insulation block 16. In the described embodiment, a circular shape is shown for illustrative purposes, however, it will be understood that other shapes and sizes may be substituted without departing from the scope of the invention as claimed herein. Ring 22 is held in place by two fasteners 18, 20 which may be threaded fasteners, for example. Ring 22 includes an aperture 24 through which the advancing conductor passes. The aperture 24 has a predetermined diameter sized to match the maximum permissible variation in conductor cross-sectional dimension.

In operation, conductor 12 advances toward an entry opening 28 in the extruder 26. When a defect, such as a "birdcage" defect 14 in conductor 12, approaches the extruder 26 it passes through defect detector 15 before it reaches the extruder entry opening 28. Entry of the defect 14 into extruder 26 ordinarily would cause blockage and breaking of the conductor with the necessity of interrupting operation and the application of insulation by the extrusion process. According to the invention, the defect detector 15 will detect most "birdcage" defects or kinks and shut down the extrusion apparatus before the defect can jam the extrusion head and cause breakage of the conductor.

Figure 2:
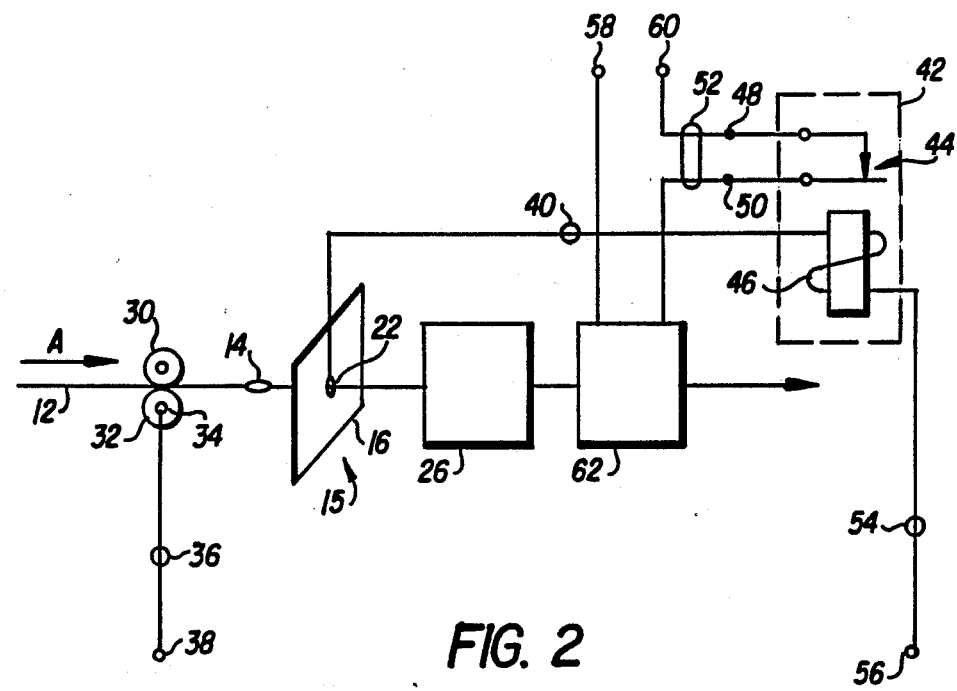

FIG. 2 illustrates one of the available arrangements in which the present invention 10 can be operatively connected to provide emergency shut-down of the extrusion apparatus upon detection of a conductor defect. Powered takeup apparatus 62 is arranged to advance the electrical conductor along its pathway through the extruder 26. As conductor 12 is advanced along the direction of travel illustrated by arrow A, any known apparatus for making electrical contact with such a moving wire may be used to make electrical contact with the conductor. For the purposes of the present description, the conductor 12 may be passed between a pair of wheels 30, 32 forming a conductor contactor 11. At least one of the wheels 32 is electrically conductive, and includes an electrical contact 34 for external connection to a circuit.

Relay 42 may be a conventional relay of the type known to electrical artisans, and which ordinarily includes an electrically operable coil 46, which in turn causes at least one set of contacts 44 to be opened (as shown) or closed (not shown) when operated. A wire 40 electrically connects ring 22 to coil 46 of relay 42. The conductor 12 is advanced into the extruder 26, here represented schematically, and is continuously advanced through the extruder by a powered takeup 62, also illustrated schematically. The powered takeup is illustrated as receiving electrical power via contacts 58, 60 connected to a power source (not shown) via relay 42, contacts 44, and terminals 48, 50 between takeup 62 and the external power source (not shown) at terminals 58, 60. Relay coil 46 is connected to a voltage source (also not shown) at terminal 56 via wire 54. Note that the relay and power source circuits are shown as simply as possible to broadly illustrate the relay and powered takeup 62 circuits. More elaborate electrical drive connection configurations known in the art may be used.

As the conductor 12 defect 14 advances through aperture 24, electrical contact is made between conductor 12 and conductor ring 22 of defect detector 15, thereby completing an electrical circuit which includes terminal 38, wire 36, contact 34 on wheel 32, conductor 12 and defect 14, ring 22, wire 40, and a relay 42 which includes relay coil 46, then wire 54 to terminal 56. By placing an electrical potential between terminals 38 and 56, the relay coil will be energized whenever a conductor 12 defect 14 contacts ring 22 of defect detector 15. Relay 42 is shown with "break" contacts 44 connecting terminals 48, 50 to the extruder 26 power circuits via cable 52. In certain instances "make" relay contacts may be required, as will be apparent to one of ordinary skill in the electrical machinery art.

Terminals 48, 50 may alternatively be connected to the emergency stop switch (not shown) of an existing system in order to interrupt advancement of conductor 12 into extruder 26 whenever a defect 14 is detected. Conventional electrically operated braking means (not shown) may also be used to ensure rapid stops of the advancing conductor or other portions of the apparatus.

Although the defect detector 15 is illustrated in the preferred embodiment as a ring-like device 22 closely surrounding the conductor 12, it should be apparent that the invention is not limited to that specific arrangement. It should also be noted that other apparatus for contacting the conductor 12 other than contact wheels 30, 32 are contemplated, and any equivalent relay and similar electrical current switching device may be substituted for relay 42. No specific operating voltage for the detection circuit is given. Such operating voltage can be readily determined by one of ordinary skill in the electrical machinery arts following selection of an appropriate relay or equivalent.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. In extruder apparatus for extruding an insulative sheathing on an elongated electrical conductor having a predetermined maximum cross-section dimension, means for advancing said conductor through said extruder apparatus and means for supplying electrical energy to said advancement means, a conductor defect detector comprising:

first electrical contact means surrounding said electrical conductor for detecting a conductor cross-section greater than said predetermined cross-section dimension; and means for interrupting the electrical energy supplied to said advancement means, said interrupting means comprising electrical relay means having a primary operating circuit and a secondary circuit including a second electrical contact means, said first electrical contact means, said electrical conductor, and said relay primary operating circuit being connected together in series such that electrical contact of the electrical conductor and the first electrical contact means completes the relay primary circuit to operate the relay secondary circuit and interrupt operation of the advancing means.

2. The apparatus of claim 1, wherein said means for supplying electrical energy to said advancing means includes a stop switch, said relay secondary circuit being connected to the stop switch to interrupt operation of the advancing means.

3. Apparatus for detecting defects of an electrical conductor having an axis, comprising:
   (a) means for processing said electrical conductor;
   (b) means for advancing said conductor in the direction of said means for processing;
   (c) means for detecting a conductor defect disposed at least partially around said conductor axis;
   (d) means responsive to said means for detecting for interrupting advancement of said conductor; and
   (e) an electrically conducting member;
   wherein said means for detecting comprises an insulating frame member arranged approximately normal to the conductor advancement direction and said electrically conducting member is disposed in said frame member.

4. The apparatus of claim 3, wherein said means for detecting is a conductor birdcage defect detector.

5. The apparatus of claim 3, wherein said means for detecting is a conductor cross section defect detector.

6. The apparatus of claim 3, wherein said electrically conducting member has an aperture which closely surrounds the electrical conductor.

7. The apparatus of claim 6, wherein said conductor has a cross section shape and dimension, and said aperture (i) has a cross-sectional area larger than the cross-sectional area of the conductor and (ii) conforms generally to the shape of the conductor.

8. The apparatus of claim 3, wherein said means for detecting and said means for processing are spaced apart, said spacing providing a first time lapse for advancement of said conductor defect from said means for detecting in the direction of said means for processing such that a second time lapse between initiating and completing interrupting advancement of said conductor is less than the first time lapse.

9. The apparatus of claim 8, wherein said means for detecting is spaced from said means for processing by a distance sufficient to permit interrupting advancement of the conductor in the direction of the means for processing within 10 seconds of detection of a conductor defect.

10. The apparatus of claim 8, wherein said conductor has a maximum rate of advancement and said means for detecting is spaced from said means for processing by a distance sufficient to permit interrupting conductor advancement in the direction of the means for processing when the conductor is advanced at said maximum rate.

11. A method of preventing breakage of an electrical conductor entering an extruder for application of an extrudable coating, comprising the steps of:
   (a) advancing said conductor through said extruder apparatus;
   (b) detecting a defect in said advancing conductor by causing an electrical current flow in response to the advancement of the conductor defect through an aperture in an electrically conductive member at a predetermined point upstream of said extruder by applying a voltage potential between said conductor and said electrically conductive member; and
   (c) utilizing the electrical current flow to interrupt advancement of said conductor through said extruder apparatus.

12. The method of claim 11 wherein said defect comprises an enlarged cross-sectional area of said conductor.

* * * * *